United States Patent
Shaw et al.

(10) Patent No.: US 11,301,417 B1
(45) Date of Patent: Apr. 12, 2022

(54) STUB FILE SELECTION AND MIGRATION

(71) Applicant: EMC IP Holding Company LLC, Hopkinton, MA (US)

(72) Inventors: Rabi Shankar Shaw, Bangalore (IN); Anurag Bhatnagar, Bangalore (IN); Sarat Kumar Behera, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/034,216

(22) Filed: Sep. 28, 2020

(51) Int. Cl.
*G06F 16/11* (2019.01)
*G06F 16/21* (2019.01)
*G06F 16/185* (2019.01)

(52) U.S. Cl.
CPC .......... *G06F 16/113* (2019.01); *G06F 16/185* (2019.01); *G06F 16/214* (2019.01)

(58) Field of Classification Search
CPC ..... G06F 16/113; G06F 16/185; G06F 16/214
See application file for complete search history.

(56) References Cited

U.S. PATENT DOCUMENTS

| | | | |
|---|---|---|---|
| 2004/0049513 A1* | 3/2004 | Yakir | G06F 16/1744 |
| 2009/0300079 A1* | 12/2009 | Shitomi | G06F 3/0649 |
| 2011/0078117 A1* | 3/2011 | Ishii | G06F 11/1453 707/640 |
| 2014/0250157 A1* | 9/2014 | Sutoh | G06F 16/185 707/827 |
| 2016/0004708 A1* | 1/2016 | Takaoka | G06F 11/1446 707/667 |
| 2016/0306704 A1* | 10/2016 | Smith | G06F 3/0482 |
| 2017/0353526 A1* | 12/2017 | Basva | H04L 67/34 |
| 2020/0073802 A1* | 3/2020 | Pradhan | G06F 11/1469 |

OTHER PUBLICATIONS

Ryussi Technologies, "SMB vs. NFS," https://www.mosmb.com/smb-vs-nfs/, Apr. 17, 2017, 4 pages.
Wikipedia, "EMC Atmos," https://en.wikipedia.org/w/index.php?title=EMC_Atmos&oldid=931333834, Dec. 18, 2019, 2 pages.
Google Cloud, "Data Rehydration," https://cloud.google.com/transfer-appliance/docs/2.0/data-rehydration, Jun. 22, 2020, 1 page.

(Continued)

*Primary Examiner* — Cam Y T Truong
(74) *Attorney, Agent, or Firm* — Ryan, Mason & Lewis, LLP (57) ABSTRACT

A method comprises selecting at least a given stub file of one or more stub files for migration from a source storage location to a target storage location. The selection of the given stub file is based at least in part on a database entry comprising source storage location path information for the given stub file. The one or more stub files correspond to one or more archived files, and the one or more stub files and one or more non-stub files are stored in the source storage location. In the method, the given stub file is migrated to the target storage location without migrating the one or more non-stub files to the target storage location. The method further includes modifying the database entry by replacing the storage location path information with target storage location path information for the given stub file.

20 Claims, 7 Drawing Sheets

(56) References Cited

OTHER PUBLICATIONS

DELL EMC, "DELL EMC Unity Cloud Tiering Appliance (CTA), A Detailed Review" White Paper, Mar. 2019, 32 pages.
Dell, "About Data Rehydration," psonlinehelp.dell.com/en/V8.0/GUID-6A8E5DF5-66FD-4891-95FE-136748280400.html, Accessed Sep. 2, 2020, 1 page.
Muonics, Inc. "Object Identifier Values," http://www.muonics.com/Docs/MIBSmithy/UserGuide/oidvalues.php, Accessed Sep. 10, 2020, 3 pages.

* cited by examiner

Policy Name : stub Migration

Rules

| Rule | Matching Expression | Action |
|---|---|---|
| 1 | size > 1 MB and atime > 1 day and attrctime > 2 weeks | Migrate |

```
INFO="<?xml version="1.0" encoding="UTF-8"?>
<RFStubInfo Version="1"
LastModifiedTime="131685884710000000"
LastModifiedTimeUTC="Thursday, 2018-04-19
05:14:31+0000"
ArchiveTime="132046314620000000"
ArchiveTimeUTC="Monday, 2019-06-10 09:11:02+0000"
FileSize="110828668"
RetentionTimeInSeconds="0"
SecondaryStorageProtocol="CIFS"
SecondaryStorageClass="CAS"
SecondaryDeviceType="AMAZONS3"
Amazons3Name="amazon1"
Amazons3OIDVersion="1"
Amazons3OIDValue="emc-cta-
singapore+cta_10.31.208.227_1560157864_2408_1?comp-
fsize=81151704"
SecurityHash="3e14b398ef02aa50bd33f067cdb1453d"
>
</RFStubInfo>
```

STUB FILE SELECTION AND MIGRATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage and migration in information processing systems.

BACKGROUND

Users archive data based on one or more policies. For example, data can be moved between storage arrays and one or more cloud storage platforms. In the event a file is moved from a storage array to a cloud storage platform, a stub file may be generated in an original file location on a storage array. The stub file occupies less memory space than the original file, and provides users with access to the original file when the stub file is read.

In some cases, stub files and other files which are not stub files may be stored together on the same device. Using conventional approaches, in a data sharing or data exporting scenario where files are migrated, the stub files are typically not distinguished from the other files, and both the stub and other files are migrated. Also, under current approaches, mechanisms to control movement of stub files are inadequate, which causes unwanted delays and errors when sharing and/or exporting data.

SUMMARY

Illustrative embodiments provide techniques to automate segregation of stub files in data sharing and/or data exporting scenarios, for example, so that the non-stub files remain in a source location, and the stub files are moved from the source location to a new (e.g., target) location, without having to rehydrate data. Additional or alternative techniques for stub file selection and migration are provided in other illustrative embodiments.

In one embodiment, a method comprises selecting at least a given stub file of one or more stub files for migration from a source storage location to a target storage location. The selection of the given stub file is based at least in part on a database entry comprising source storage location path information for the given stub file. The one or more stub files correspond to one or more archived files, and the one or more stub files and one or more non-stub files are stored in the source storage location. In the method, the given stub file is migrated to the target storage location without migrating the one or more non-stub files to the target storage location. The method further includes modifying the database entry by replacing the storage location path information with target storage location path information for the given stub file.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "stub file" refers to a file placed in an original file location on a storage device when the original file is archived to an archive location, such as, for example, a cloud storage platform. According to an embodiment, when a stub file is read in an input-output (TO) operation, the IO operation is passed through to the original file located in the archive location, and the original file may be presented to a user as if the original file were in its original location on the storage device. The stub file occupies less memory space ("size on disk") than the original file.

As used herein, a "non-stub file" refers to a file that is not a stub file. For example, a non-stub file comprises the entire file data and is located in a file location on a storage device, such that when the non-stub file is accessed at the file location and read, the non-stub file is presented to a user.

Illustrative embodiments provide techniques for automatically identifying and migrating stub files. In an illustrative embodiment, a plurality of stub files on a storage device, such as a storage array, correspond to archived files that were archived to an archive location. Using an archiving and migration platform comprising, for example, a cloud tiering appliance (CTA), files may be archived from the storage device to a cloud storage platform, and stub files corresponding to the archived files are generated in place of the original files that have been archived. Information for the plurality of stub files is maintained in a database such as, for example, a CTA database or other migration appliance database. The stub files are stored in a location on the storage device with one or more non-stub files.

A migration scenario may occur where it is desired that only the stub files and not the non-stub files be migrated to a new storage location. Under current approaches, there are no automated techniques to separate the stub files from the non-stub files, and both the stub and non-stub files must be moved to a new storage location from a source location, such that non-stub files must be deleted from the new storage location following the migration. Advantageously, illustrative embodiments permit stub files to be identified and selected for migration without having to also migrate the non-stub files.

In one or more embodiments, a policy indicating which stub files are to be migrated to a new location, and a list of stub files matching the policy are generated using a migration appliance (e.g., CTA database) and a migration appliance policy engine (e.g., CTA policy engine). Stub files are constructed in the new destination using one or more protocols such as, for example, Server Message Block (SMB) and/or Network File System (NFS) protocols. Required information for constructing the stub files is available in the migration appliance database. Additionally, the migration appliance database is updated with new paths corresponding to the new storage location for the constructed stub files. The stub files that were created in the new destination are deleted from the source location. Advantageously, migration becomes more efficient since users no longer need to iterate through a source file system to determine which files to migrate, and no longer need to iterate through a destination file system to determine which files to delete.

Figure 1:
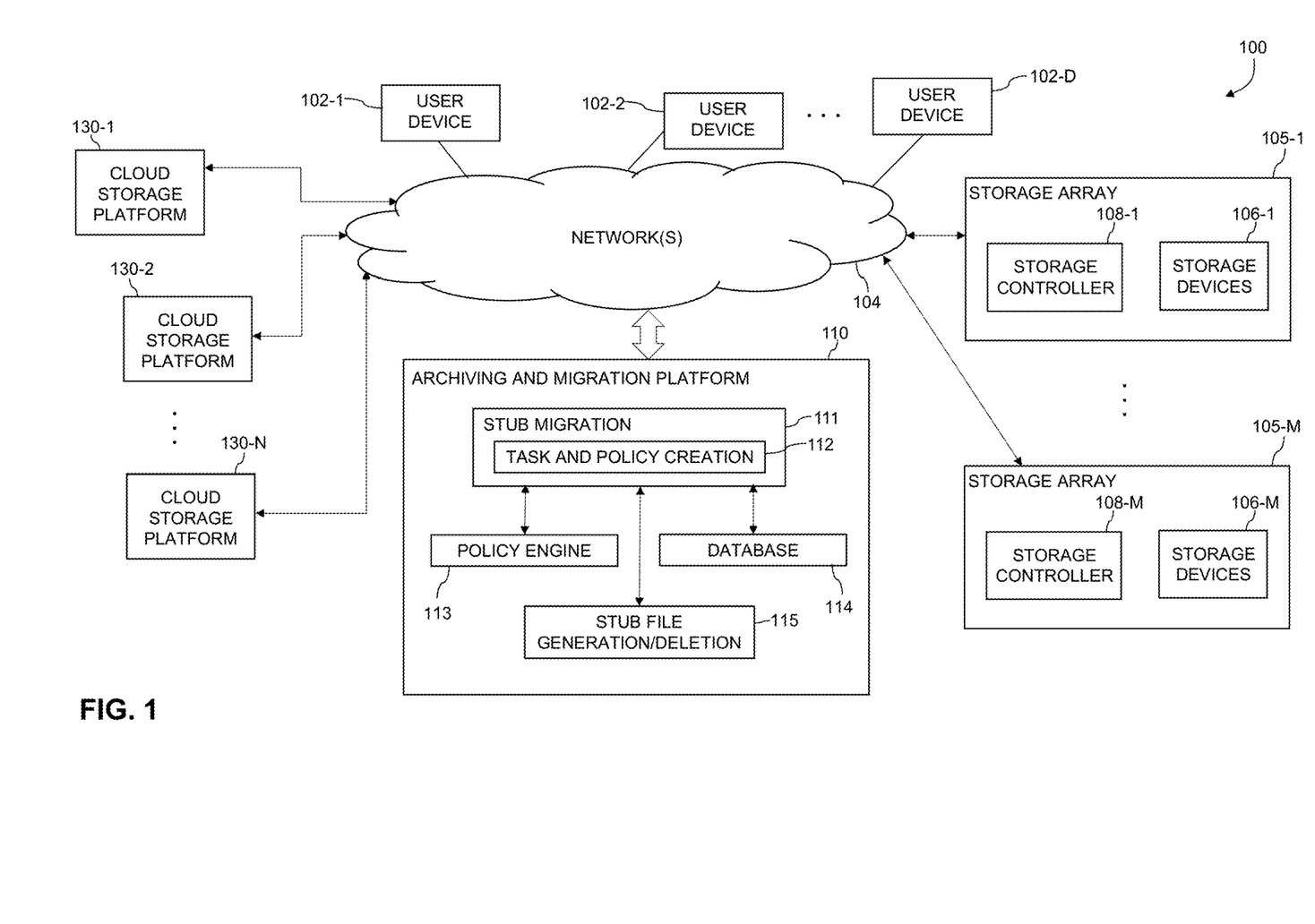
FIG. 1 depicts details of an information processing system with an archiving and migration platform for automatically identifying and migrating stub files according to an illustrative embodiment.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with an archiving and migration platform 110. A non-limiting example of an archiving and migration platform 110 comprises a CTA, but the embodiments are not necessarily limited thereto. The user devices 102 may also communicate over the network 104 with a plurality of storage arrays 105-1, . . . 105-M, collectively referred to herein as storage arrays 105. The storage arrays 105 comprise respective sets of storage devices 106-1, . . . 106-M, collectively referred to herein as storage devices 106, coupled to respective storage controllers 108-1, . . . 108-M, collectively referred to herein as storage controllers 108.

The user devices 102 can comprise, for example, Internet of Things (IoT) devices, desktop, laptop or tablet computers, mobile telephones, or other types of processing devices capable of communicating with the archiving and migration platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L, M, N and P are assumed to be arbitrary positive integers greater than or equal to two.

The terms "client," "customer," "administrator" or "user" herein are intended to be broadly construed so as to encompass numerous arrangements of human, hardware, software or firmware entities, as well as combinations of such entities. At least a portion of the available services and functionalities provided by the archiving and migration platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the archiving and migration platform 110, as well as to support communication between the archiving and migration platform 110 and connected devices (e.g., user devices 102) and/or other related systems and devices not explicitly shown.

Users may refer to customers, clients and/or administrators of computing environments for which archiving and migration are being performed. For example, in some embodiments, the user devices 102 are assumed to be associated with repair technicians, system administrators, information technology (IT) managers, software developers release management personnel or other authorized personnel configured to access and utilize the archiving and migration platform 110.

The archiving and migration platform 110 of the system 100 is configured to move data between the storage arrays 105 and one or more cloud storage platforms 130-1, 130-2, . . . 130-N, collectively referred to herein as cloud storage platforms 130. The archiving and migration platform 110 is also configured to move data from one of the storage arrays 105 to another one of the storage arrays 105, from one of the user devices 102 to another one of the user devices 102, between the user devices 102 and one or more storage arrays 105 or one or more cloud storage platforms 130 and between different locations (e.g., directories) within the same storage array 105 or within the same user device 102.

The archiving and migration platform 110 is configured to move data, for example, by moving data files, snapshots or other data objects in and between the user devices 102, the storage arrays 105 and the cloud storage platforms 130. A given data object may comprise a single data file, or multiple data files. According to one or more embodiments, the archiving and migration platform 110 permits administrators to automatically move data in and between the user devices 102, the storage arrays 105 and the cloud storage platforms 130 based on user-configured policies. The cloud storage platforms 130 include, for example, Dell® EMC® Elastic Cloud Storage (ECS), Microsoft® Azure®, Amazon® S3, and/or IBM® Cloud Object Storage (COS) platforms, or other available cloud infrastructures.

The archiving and migration platform 110 in the present embodiment is assumed to be accessible to the user devices 102, and vice-versa, over the network 104. In addition, the archiving and migration platform 110 and the user devices 102 can access the storage arrays 105 and the cloud storage platforms 130 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The archiving and migration platform 110, on behalf of respective infrastructure tenants each corresponding to one or more users associated with respective ones of the user devices 102 provides a platform for automatically identifying and migrating stub files. Referring to FIG. 1, the archiving and migration platform 110 comprises a stub migration engine 111, a policy engine 113, a database 114 and a stub file generation and deletion engine 115. The stub migration engine 111 comprises a task and policy creation component 112.

The archiving and migration platform 110 in some embodiments comprises configurable data mover modules adapted to interact with the user devices 102, the storage arrays 105 and the cloud storage platforms 130. At least one configuration file is implemented in or otherwise associated with the archiving and migration platform 110. The state of the configuration file may be controlled at least in part by a job scheduler implemented as part of the archiving and migration platform 110. The job scheduler interacts with the policy engine 113.

The archiving and migration platform 110 can include at least one application programming interface (API) that permits an external component to control selection between various modes of operation. For example, the above-noted job scheduler can access the configuration file via such an API in order to control a mode of operation of the archiving and migration platform 110. Additionally or alternatively, an application running on one or more of the user devices 102 can access the configuration file via the API in order to control the mode of operation of the archiving and migration platform 110.

In some embodiments, the archiving and migration platform 110 is configurable via the configuration file in a mode of operation in which a particular type of data movement in and between user devices 102, the storage arrays 105 and the cloud storage platforms 130 occurs for a given data object being utilized by an application running on one or more of the user devices 102. Furthermore, other embodiments can configure the archiving and migration platform 110 in different modes of operation without the use of a configuration file. Thus, such a configuration file should not be viewed as a requirement.

The archiving and migration platform 110 is illustratively coupled to the network 104 and configured to control transfer of data in and between the user devices 102, the storage arrays 105 and the cloud storage platforms 130. The term "data movement" as used in this and other contexts herein is intended to be broadly construed, so as to encompass data migration as well as other types of movement of data and relocation in and between the user devices 102, the storage arrays 105 and the cloud storage platforms 130. A given data mover module can be implemented at least in part on storage arrays 105 or other storage platforms that implement at least portions of one or more storage tiers of the multi-tier storage system.

In one or more embodiments, the archiving and migration platform 110 can be used to tier file data and archive block data to the cloud storage platforms 130, and to recall file data and restore block data to the storage arrays 105 from the cloud storage platforms 130. In some embodiments, the archiving and migration platform 110 can be used to migrate repositories between cloud storage platforms 130, storage arrays and/or user devices 102.

In a file tiering process (also referred to herein as "cloud tiering") or file archiving process, the policy engine 113 is configured to identify files that fit an administrator-defined criteria, and the archiving and migration platform 110 initiates movement of the identified files to a cloud storage platform 130. The stub file generation and deletion engine 115 creates a stub file in the original file location on, for example, the storage array 105 or the user device 102. According to an embodiment, when the stub file is read, the archiving and migration platform 110 recalls or passes an IO operation through to the original file located in the cloud storage platform 130, and the original file may be presented to a user as if the original file were in its original location on the storage array 105 or user device 102.

In a block archiving process, the policy engine 113 identifies block snapshots that fit an administrator-defined criteria, and the archiving and migration platform 110 initiates archiving of the identified snapshots to a cloud storage platform 130, leaving the identified snapshots in the storage arrays 105 or user devices 102. After the identified snapshots are backed up to one or more of the cloud storage platforms 130, the original snapshots can be erased from the storage arrays 105 or user devices 102 to free up space. Users may initiate restoring of one or more snapshots to one or more of the storage arrays 105 or user devices 102.

According to an embodiment, in file tiering, file archiving and block processes, the policy engine 113 scans, for example, files and/or snapshots and applies policy rules to each file and/or snapshot. If there are multiple rules in a policy, the policy engine 113 applies the rules to a given file and/or snapshot until a rule evaluates to "true," and then takes the action associated with the rule, such as, for example, "archive" or "don't archive." Some examples of rules governing whether files and/or blocks are archived may be based on or more constraints such as, for example, when a file and/or snapshot was last accessed or modified, when file or snapshot attributes were last changed, and/or a size of a file or snapshot (e.g., >10 MB). Rules may also be based on file or snapshot names (e.g., only archive files or snapshots having certain names or parts of names) and/or directory name (e.g., only archive files or snapshots from specified directories or from directories having certain names or parts of names).

As noted herein, there may be situations where there are both stub files and non-stub files in a storage location. For example, after a file tiering or archiving process, where stub files corresponding to tiered or archived files were created in a storage location (e.g., directory on a user device 102 or storage array 105), non-stub files may be added to the same storage location where the stub files are located, so that there are stub files and non-stub files in the same storage location (e.g., same directory, same drive, same folder, etc.) on a device. The device can be, for example, one of the user devices 102 or one of the storage arrays 105. Given a scenario where a user wants to move only the stub files and not the non-stub files from a source storage location to a different target storage location on the same or a different device, the archiving and migration platform 110 is configured to select one or more of the stub files for migration to the target location, while excluding the non-stub files from the migration.

More specifically, the stub migration engine 111 comprises a task and policy creation component 112, which generates an interface for a user to create one or more migration tasks and one or more associated policies. The interface is accessible via, for example, the user devices 102, and enables a user to specify a plurality of parameters for a migration task. Some non-limiting examples of task parameters include: (i) a source path specifying a starting point of migration (e.g., source storage location); (ii) a destination path specifying a target storage location where the stub files will be moved; (iii) a migration policy specifying a set of rules (e.g., constraints) to be applied by the policy engine 113 in connection with evaluating whether particular stub files are to be migrated; (iv) one or more protocols (e.g., SMB, NFS) to use for reading the stub files from the source storage location and for writing the stub files to the target storage location; (v) a name of the migration (e.g., share/export name); and (vi) server names or other identifying information (e.g., IP addresses) corresponding to the source and target storage locations. According to one or more embodiments, the interface may comprise a plurality of editable fields for a user to input the task parameters.

Figure 3:
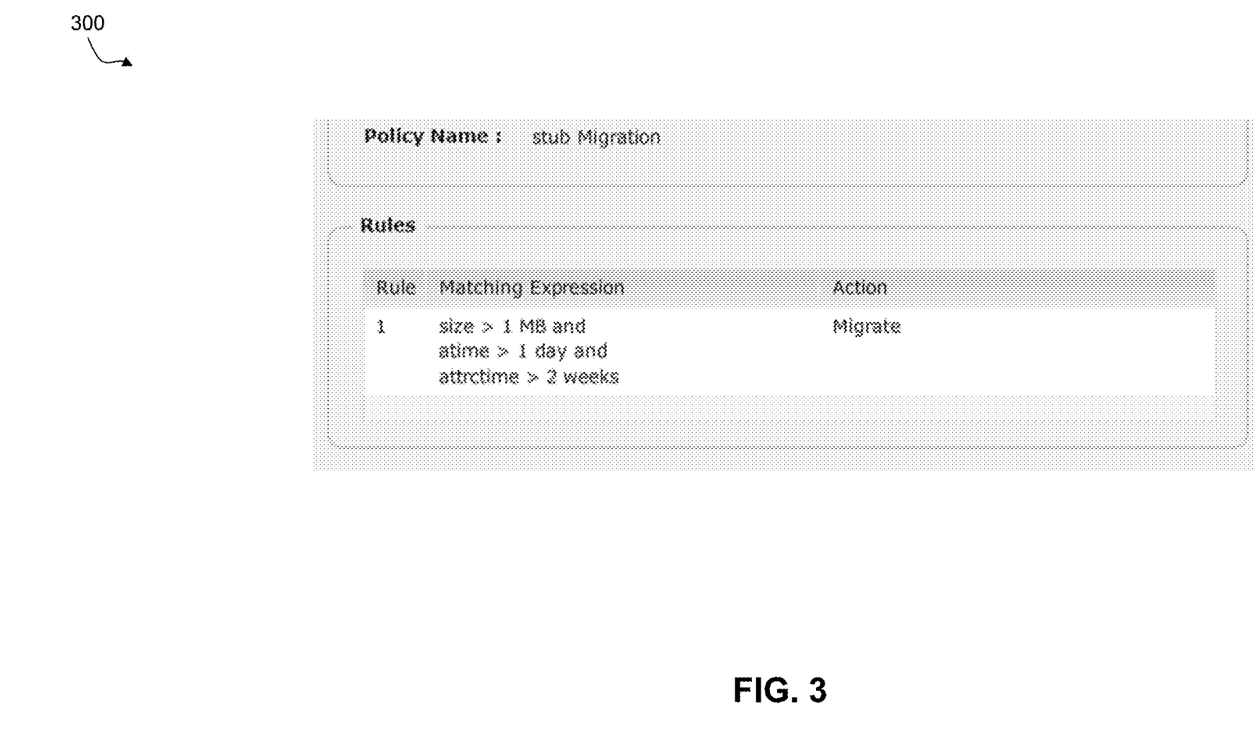
FIG. 3 depicts details of a stub file migration policy according to an illustrative embodiment.

Referring, for example, to FIG. 3, a stub migration policy 300 illustrates some constraints that a user may specify to determine which stub files are to be migrated. The one or more constraints in the stub migration policy 300 comprise a file size of the archived file corresponding to the stub file (e.g., size >1 MB), a time when the stub file and/or the archived file corresponding to the stub file was last accessed with respect to the execution of the migration (e.g., atime >1 day prior to the migration), and a time when attributes of the stub file and/or of the archived file corresponding to the stub file were last changed with respect to the execution of the migration (e.g., attrctime >2 weeks prior to the migration) or a specific date when attributes were changed. Other constraints that may be specified in a policy include, but are not necessarily limited to, the last time the stub file and/or the archived file corresponding to the stub file was modified, a name or a part of a name of the stub file and/or of the archived file corresponding to the stub file, a directory name, drive name, folder name, etc. associated with the location of stub file, and a time when the archived file corresponding to the stub file was archived. Modifications comprise changes in file content, and attribute changes comprise changes to various i-node fields for a file. Whenever a modified time changes, attribute change time also changes, but not vice versa. Attribute change time also changes when file ownership, size or link count changes for a file.

Figure 2:
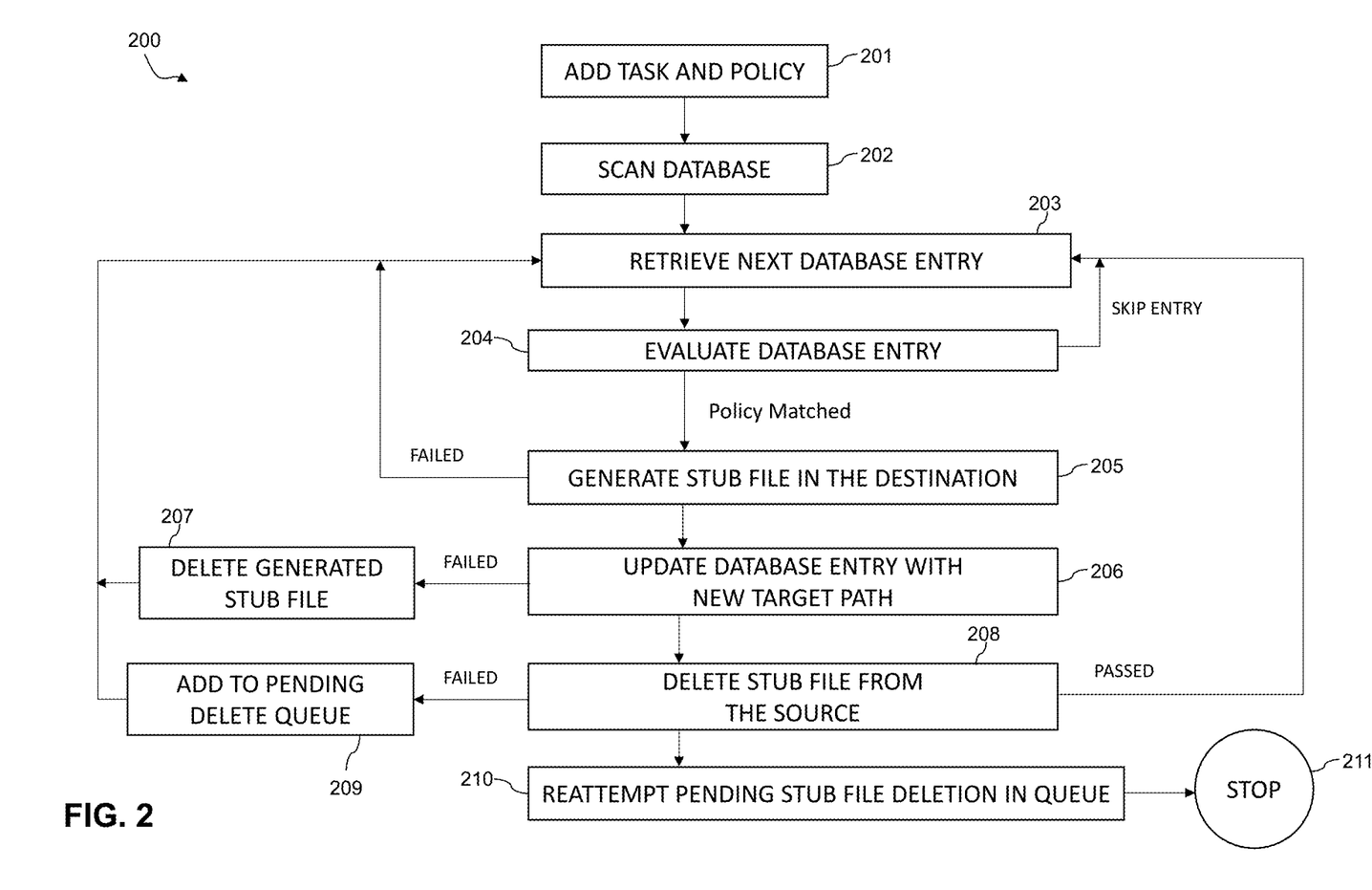
FIG. 2 depicts details of an operational flow for automating separation of stub files in data sharing and/or data exporting scenarios, and generating the stub files in a target location according to an illustrative embodiment.

As can be seen in the operational flow 200 in FIG. 2 (also referred to as "process 200"), the migration task and stub migration policy are added by a user (block 201). The stub migration engine 111, and more specifically, the task and policy creation component 112, generates the task and policy for a given migration based on a user's input. Referring to blocks 202, 203 and 204 in FIG. 2, the policy engine 113 scans entries in database 114 pertaining to stub files to evaluate the database entries to determine whether the stub files satisfy the constraints set forth in a given stub migration policy. The database 114 comprises a plurality of entries corresponding to respective stub files that were created to correspond to files that were archived and/or tiered to a cloud storage platform (e.g., one of the cloud storage platforms 130).

Figure 4:
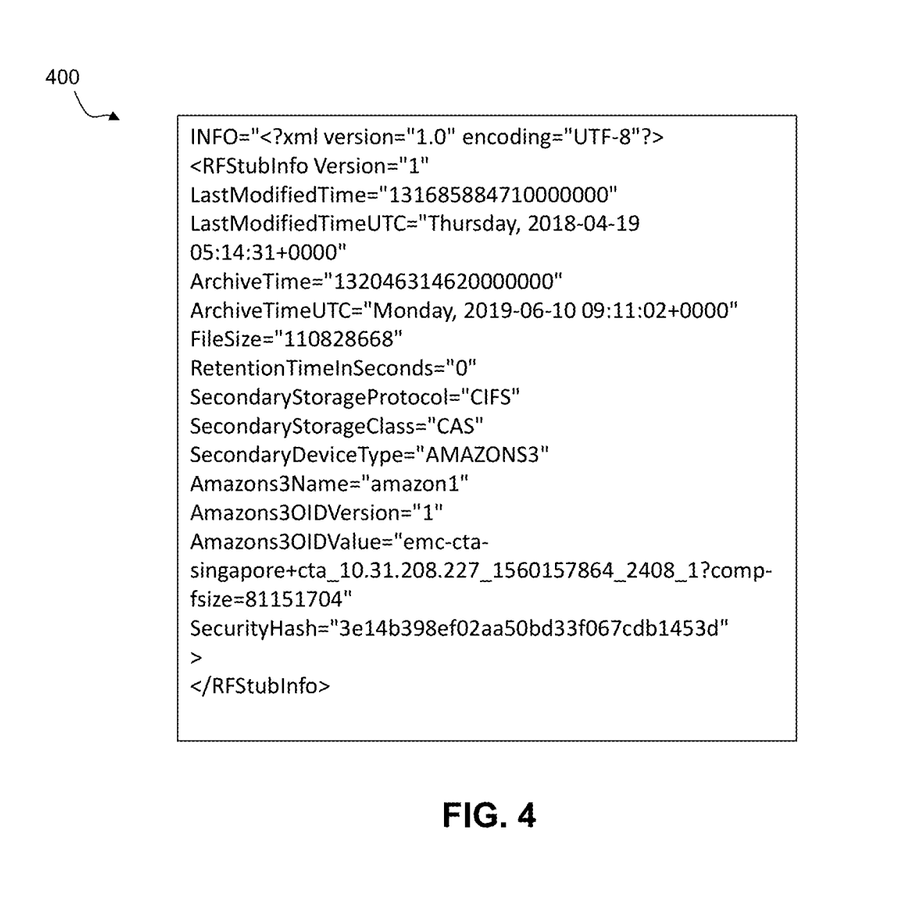
FIG. 4 depicts an example of the stub file information available from a migration appliance database according to an illustrative embodiment.

Referring to FIG. 4, stub file information 400 available from the database 114 comprises, but is not necessarily limited to, the last time the stub file and/or the archived file corresponding to the stub file was modified, a time when the archived file corresponding to the stub file was archived, a file size of the archived file corresponding to the stub file, a retention time, a secondary storage protocol, a secondary storage class, a secondary device type (e.g., the cloud storage platform on which the archived file corresponding to the stub file is stored), the name, object identifier (OID) version and OID value corresponding to the device on which the archived file corresponding to the stub file is stored, and a security hash for the stub file. The retention time comprises a time frame where no modifications to a stub file are allowed. Secondary storage protocol comprises a protocol by which a file is tiered to a secondary destination (e.g., Network File System (NFS) or Common Internet File System (CIFS)), secondary storage class indicates a class of the secondary destination (e.g., content-addressed storage (CAS), network-attached storage (NAS), etc.) and secondary device type comprises a type of secondary destination such as, for example, Azure®, Amazon® S3, etc.

Although not shown in FIG. 4, the stub file information in the database 114 further comprises storage location path information for any given stub file. For example, the storage location path information comprises a name of the archived file corresponding to the stub file, a directory name, drive name, folder name(s), etc. associated with the location of stub file, as well as identifying information for the device (e.g., device name, IP address) on which the stub file is stored.

Referring back to FIG. 2, at blocks 202 and 203, the policy engine 113 scans the database 114 and retrieves respective stub file entries from the database 114. At block 204, the policy engine 113 evaluates a given database entry corresponding to a stub file to determine whether the stub file satisfies the constraints set forth in a given stub migration policy. For example, the policy engine 113 evaluates the stub file information as described herein above to determine whether given stub files satisfy constraints based on, for example, an archived file size, an access and/or a modification time for the stub file and/or the archived file corresponding to the stub file, an archiving time, and/or file names. If the policy engine 113 determines that a given stub file database entry does not satisfy the policy constraints, that entry is skipped, the next entry is retrieved and the evaluation process is repeated for the next entry.

If the policy engine 113 determines that a given stub file database entry satisfies the policy constraints, the process 200 proceeds to block 205, where the stub file associated with the database entry matching the policy is generated in the target storage location specified as, for example, a task parameter. The target storage location may be specified similarly to the source storage location with directory name, drive name, folder name(s), etc. associated with the target location of stub file, as well as identifying information for the device associated with the target storage location. The stub file generation and deletion engine 115 generates the stub file in the target location. If the generation fails, the process 200 returns to block 203 to retrieve the next database entry to be evaluated. Eventually, when all of the subsequent database entries have been evaluated, the database entry associated with the stub file that could not be generated in the target location will be retrieved again, and re-evaluated so that another stub file generation attempt can be performed. There may be a specification in the migration task parameters of a specific number of times an entry can be evaluated by the policy engine 113 and an attempt can be made to generate the corresponding stub file before no further generation attempts are made.

If the generation of the stub file in the target location is successful at block 205, the process 200 proceeds to block 206, where the entry in the database 114 corresponding to the generated stub file is updated to replace the source storage location path information with the target storage location path information indicating the new location of the stub file. If the update fails at block 206, the process 200 proceeds to block 207 where the generated stub file is deleted from the target location by the stub file generation and deletion engine 115, and then the process 200 returns to block 203 to retrieve the next database entry to be evaluated. Eventually, when all of the subsequent database entries have been evaluated, and stub files associated with subsequent database entries matching the policy have been generated in the target location, the database entry associated with the stub file that could not be updated to reflect the target location path will be retrieved again, and re-generated by the stub file generation and deletion engine 115 in the target storage location so that another attempted database update can be performed. There may be a specification in the migration task parameters of a specific number of times an entry can be evaluated by the policy engine 113 and an attempt can be made to generate the corresponding stub file and update the database before no further update attempts are made.

If the update is successful at block 206, the process 200 proceeds to block 208, where the stub file generation and deletion engine 115 deletes the stub file from the source storage location since the stub file is now present in the target storage location and the database 114 has been successfully updated to reflect the target storage location as the new path. In the case of a successful deletion at block 208, the process 200 returns to block 203 to retrieve the next database entry. When a stub file is deleted from the source storage location, the archived file corresponding to the stub file is not deleted. Instead, the archived file becomes an orphan file, which is a file in a repository (e.g., cloud storage platform) that does not have a stub file pointing to it. According to the embodiments, when the stub file is deleted from the source storage location, and generated in the new storage location, the archiving and migration platform 110 ensures that the database 114 is updated with the new storage location of the stub file to indicate that the stub file corresponding to the archived file is present in a new location so the archived file is not identified as an orphan file.

If the deletion fails at block 208, the pending deletion is added to a delete queue (block 209), and the process 200 returns to block 203 to retrieve the next database entry. After all database entries have been evaluated, or a specified number of times for database entry evaluation has been met, the process 200 proceeds to block 210, where any outstanding deletions of the migrated stub files (i.e., stub files that were successfully generated in the target storage location) from the source storage locations are re-attempted by the stub file generation and deletion engine 115. The process 200 is then completed at block 211. At the conclusion of the process 200, if any of the stub files were not able to be generated in the target storage location or were not able to be deleted from the source storage location, or any database entries were not able to be updated with the target location path information, the archiving and migration platform 110 transmits a notification to a user regarding any of these failures to generate, delete or update.

As a result of the policy engine 113 of the archiving and migration platform 110 evaluating entries in the database 114, which comprises stub file entries for stub files created when files have been archived and/or tiered, and does not comprise entries for non-stub files, stub files are able to be migrated to a target storage location without migrating non-stub files that may have been in the source storage location with the stub files.

According to one or more embodiments, the database 114 used herein can be configured according to a relational database management system (RDBMS) (e.g., PostgreSQL). The database 114 in some embodiments is implemented using one or more storage systems or devices associated with the archiving and migration platform 110. In some embodiments, one or more of the storage systems utilized to implement the databases comprise a scale-out all-flash content addressable storage array or other type of storage array. Similarly, the storage arrays 105 described herein may comprise scale-out all-flash content addressable storage arrays or other type of storage arrays. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the archiving and migration platform 110, the stub migration engine 111, the policy engine 113, the database 114 and the stub file generation and deletion engine 115 in other embodiments can be implemented at least in part externally to the archiving and migration platform 110, for example, as stand-alone servers, sets of servers or other types of systems coupled to the network 104. For example, the stub migration engine 111, the policy engine 113, the database 114 and the stub file generation and deletion engine 115 may be provided as cloud services accessible by the archiving and migration platform 110.

The stub migration engine 111, the policy engine 113, the database 114 and the stub file generation and deletion engine 115 in the FIG. 1 embodiment are each assumed to be implemented using at least one processing device. Each such processing device generally comprises at least one processor and an associated memory, and implements one or more functional modules for controlling certain features of the stub migration engine 111, the policy engine 113, the database 114 and/or the stub file generation and deletion engine 115.

At least portions of the archiving and migration platform 110 and the components thereof may be implemented at least in part in the form of software that is stored in memory and executed by a processor. The archiving and migration platform 110 and the components thereof comprise further hardware and software required for running the archiving and migration platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the stub migration engine 111, the policy engine 113, the database 114, the stub file generation and deletion engine 115 and other components of the archiving and migration platform 110 in the present embodiment are shown as part of the archiving and migration platform 110, at least a portion of the stub migration engine 111, the policy engine 113, the database 114, the stub file generation and deletion engine 115 and other components of the archiving and migration platform 110 in other embodiments may be implemented on one or more other processing platforms that are accessible to the archiving and migration platform 110 over one or more networks. Such components can each be implemented at least in part within another system element or at least in part utilizing one or more stand-alone components coupled to the network 104.

It is assumed that the archiving and migration platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the stub migration engine 111, the policy engine 113, the database 114, the stub file generation and deletion engine 115 and other components of the archiving and migration platform 110, and the elements thereof can each be implemented in the form of one or more LXCs running on one or more VMs. Other arrangements of one or more processing devices of a processing platform can be used to implement the stub migration engine 111, the policy engine 113, the database 114 and the stub file generation and deletion engine 115 as well as other components of the archiving and migration platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the archiving and migration platform 110 to reside in different data centers. Numerous other distributed implementations of the archiving and migration platform 110 are possible.

Accordingly, one or each of the stub migration engine 111, the policy engine 113, the database 114, the stub file generation and deletion engine 115 and other components of the archiving and migration platform 110 can each be implemented in a distributed manner so as to comprise a plurality of distributed components implemented on respective ones of a plurality of compute nodes of the archiving and migration platform 110.

It is to be appreciated that these and other features of illustrative embodiments are presented by way of example only, and should not be construed as limiting in any way.

Accordingly, different numbers, types and arrangements of system components such as the stub migration engine 111, the policy engine 113, the database 114, the stub file generation and deletion engine 115 and other components of the archiving and migration platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the archiving and migration platform can be offered to cloud infrastructure customers or other users as part of FaaS, CaaS and/or PaaS offerings.

Figure 5:
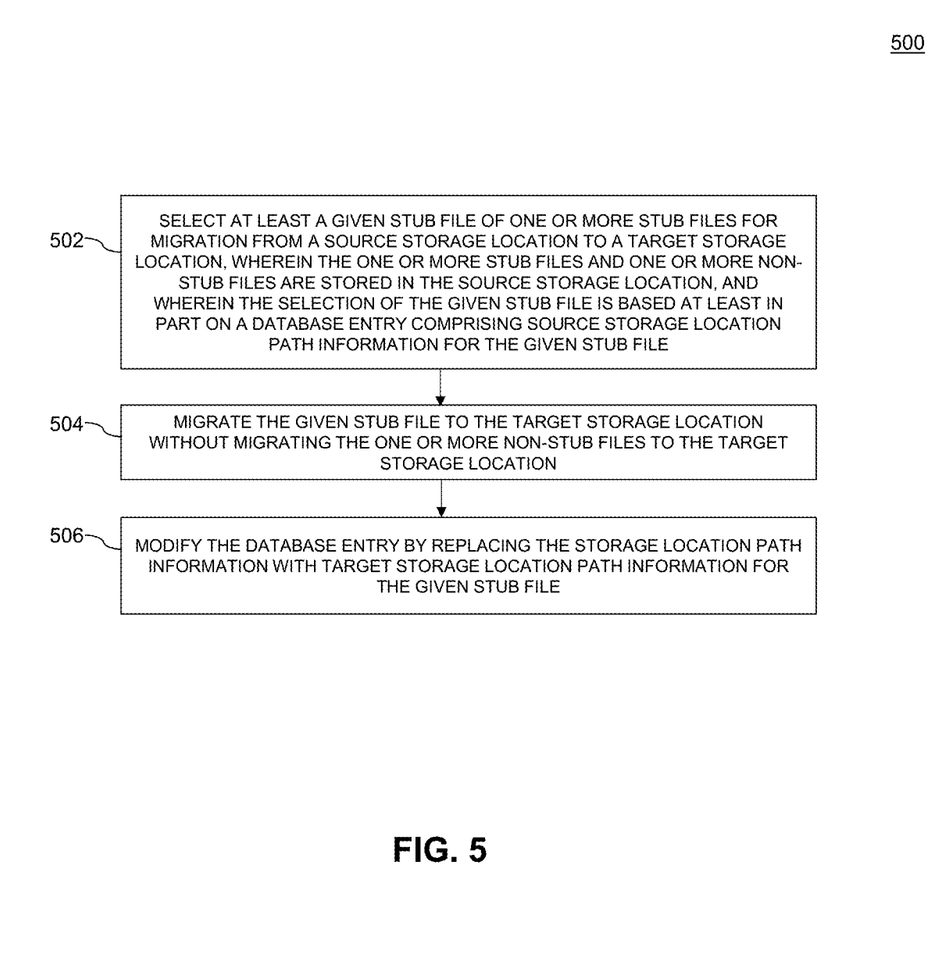
FIG. 5 depicts a process for automatically identifying and migrating stub files according to an illustrative embodiment.

The operation of the information processing system 100 will now be described in further detail with reference to the flow diagram of FIG. 5. With reference to FIG. 5, a process 500 for automatically identifying and migrating stub files as shown includes steps 502 through 506, and is suitable for use in the system 100 but is more generally applicable to other types of information processing systems comprising an archiving and migration platform configured for automatically identifying and migrating stub files.

In step 502, at least a given stub file of one or more stub files is selected for migration from a source storage location to a target storage location. The one or more stub files correspond to one or more archived files, and the one or more stub files and one or more non-stub files are stored in the source storage location. The selection of the given stub file is based at least in part on a database entry comprising source storage location path information for the given stub file. The database entry further comprises data about one or more attributes of the given stub file, wherein the one or more attributes comprise, for example, a file modification time, a file size, an archive time and a storage protocol.

In step 504, the given stub file is migrated to the target storage location without migrating the one or more non-stub files to the target storage location. In migrating the given stub file to the target storage location, the given stub file is generated in the target storage location and deleted from the source storage location. In step 506, the database entry is modified by replacing the storage location path information with target storage location path information for the given stub file.

The process may further comprise determining that the modifying of the database entry failed, deleting the generated stub file from the target storage location responsive to the determination.

In selecting the given stub file for migration, the database entry comprising the source storage location path information is evaluated to determine that the database entry satisfies one or more constraints specified in a policy. The one or more constraints comprise, for example, a file access time, a file modification time, a file size, a file name and/or a directory name. A user may define the policy including the one or more constraints via an interface generated by the archiving and migration platform 110.

According to an embodiment, the process comprises rejecting an additional given stub file of the one or more stub files for migration, wherein the additional given stub file corresponds to an additional database entry comprising source storage location path information for the additional given stub file. In rejecting the additional given stub file, the additional database entry is evaluated to determine that the additional database entry fails to satisfy the one or more constraints.

A user may select a protocol to use for reading the one or more stub files from the source storage location and for writing the one or more stub files to the target storage location via an interface generated by the archiving and migration platform 110.

It is to be appreciated that the FIG. 5 process and other features and functionality described above can be adapted for use with other types of information systems configured to execute archiving and migration services in an archiving and migration platform or other type of platform.

The particular processing operations and other system functionality described in conjunction with the flow diagram of FIG. 5 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an archiving and migration platform as disclosed herein can provide a number of significant advantages relative to conventional arrangements. For example, unlike conventional techniques, the embodiments advantageously enable users to utilize a CTA or other migration appliance to move only stub files to a new location without moving non-stub files, while also keeping the archived files corresponding to the stub files on a storage platform (e.g., cloud storage platform) without rehydrating the archived data.

When using conventional approaches, if there are both non-stub files and stub files in a source storage location, and a user wants to migrate only the stub files to a new target location, there are no automated techniques to accomplish this migration task. Instead, stub and non-stub files must be migrated to a new location and then the non-stub files must be manually deleted. Given voluminous migrations with, for example, gigabytes or terabytes of data and, for example, hundreds of thousands or millions of files, such tasks are not able to be practically performed by users using conventional migration techniques and waste computational resources.

Advantageously, the embodiments enable automated segregation of stub files from non-stub files, and eliminate the need for users to manually iterate through files on source and/or target locations to identify stub files and/or remove non-stub files, resulting in more efficient migrations. For example, the embodiments enable users to create policies for stub file migration, and provide a policy engine which scans and evaluates stub file entries in a CTA database, or other migration appliance database, to determine which stub files satisfy the policies and are to be migrated. According to one or more embodiments, the archiving and migration platform 110 (e.g., CTA) generates a list of stub files matching the policy, which can be transmitted to a user. The stub files from the list are generated in the new location using one or more protocols (e.g., SMB and/or NFS protocol), where all of the required information for constructing the stub files is available in the migration appliance database (e.g., CTA database). Additionally, orphan records will be updated based on the new storage location. The database entries are also modified to replace source storage location path information for the stub files with target storage location path information, and the stub files are deleted from the source storage location.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the archiving and migration platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an archiving and migration platform in illustrative embodiments. These and other cloud-based systems in illustrative embodiments can include object stores.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
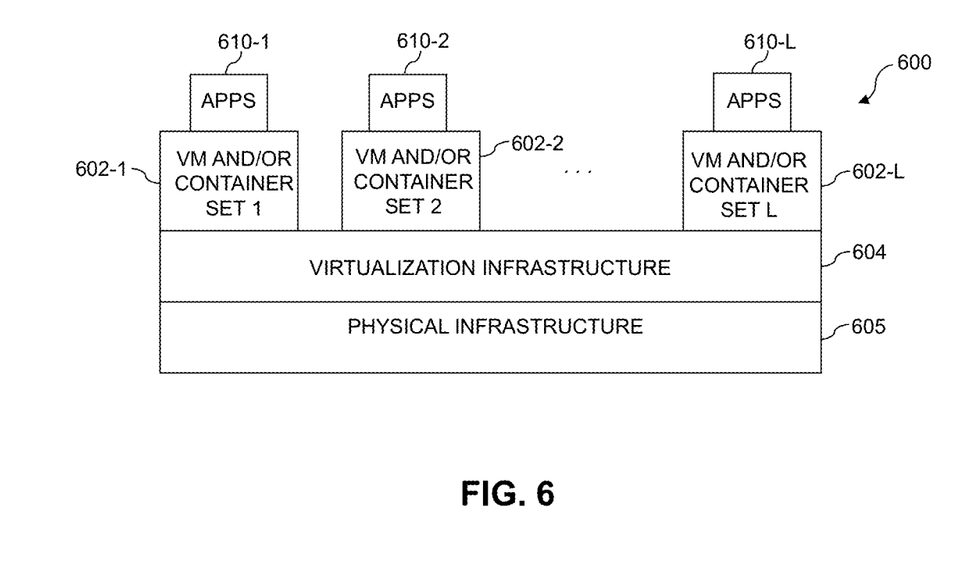
FIGS. 6 and 7 show examples of processing platforms that may be utilized to implement at least a portion of an information processing system according to illustrative embodiments.
Figure 7:
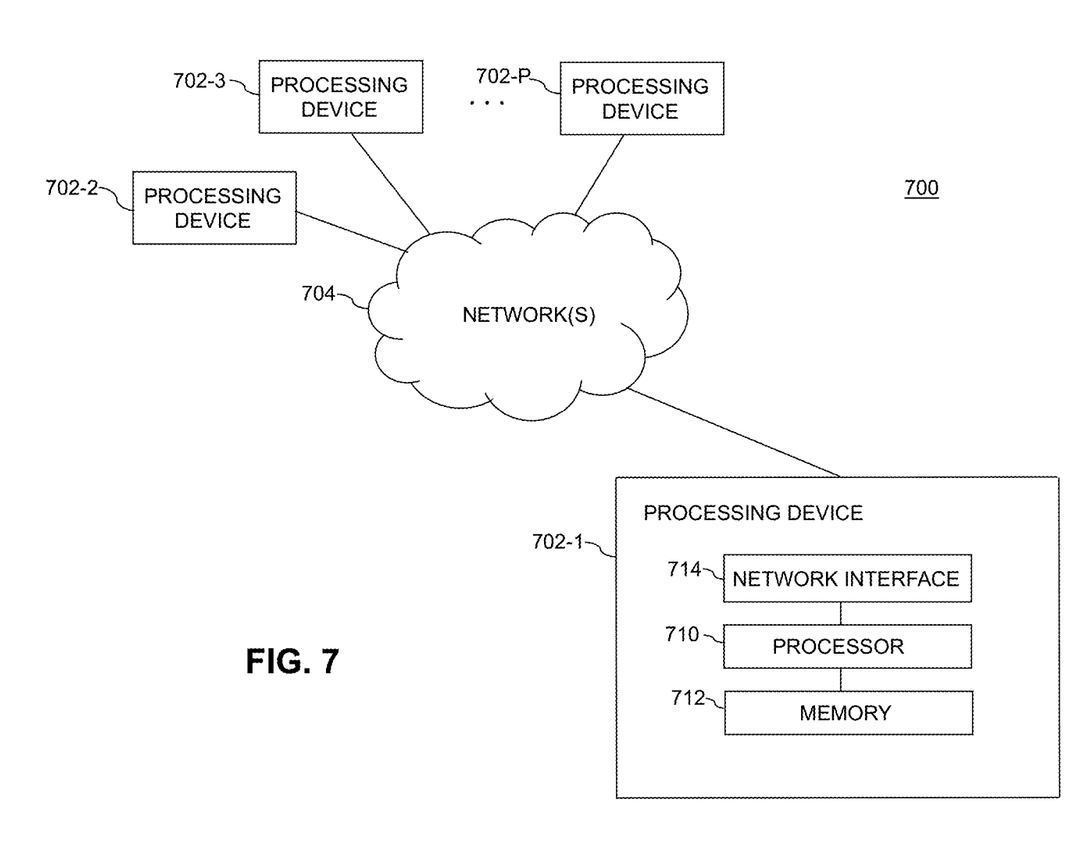

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-P, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the archiving and migration platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and archiving and migration platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising at least one processing device that comprises a processor coupled to a memory;
   said at least one processing platform being configured:
   to select at least a first stub file and a second stub file of a plurality of stub files for migration from a source storage location to a target storage location, wherein the plurality of stub files correspond to a plurality of archived files, wherein the plurality of stub files and one or more non-stub files are stored in the source storage location, wherein the selection of the first stub file and the second stub file is based at least in part on a plurality of database entries comprising source storage location path information for the first stub file and the second stub file, and wherein the plurality of database entries satisfy one or more policy constraints defined by a user;
   to migrate the first stub file and the second stub file to the target storage location without migrating the one or more non-stub files to the target storage location, wherein the migrating comprises generating the first stub file and the second stub file in the target storage location;
   to modify the plurality of database entries by replacing the storage location path information with target storage location path information for the first stub file and the second stub file;
   to determine that the modifying of a database entry of the plurality of database entries for the second stub file failed;
   to delete the generated second stub file from the target storage location responsive to the determination, wherein the second stub file is maintained in the source storage location; and
   to repeat the migrating and the modifying steps in connection with the second stub file following the deletion.

2. The apparatus of claim 1 wherein, in migrating the first stub file to the target storage location, said at least one processing platform is further configured to delete the first stub file from the source storage location.

3. The apparatus of claim 1 wherein, in selecting the first stub file and the second stub file for migration, said at least one processing platform is configured to evaluate the plurality of database entries comprising the source storage location path information to determine that the plurality of database entries comprising the source storage location path information satisfy the one or more policy constraints.

4. The apparatus of claim 3 wherein said at least one processing platform is further configured to generate a policy comprising the one or more policy constraints.

5. The apparatus of claim 3 wherein the one or more policy constraints comprise at least one of a file access time, a file modification time, a file size, a file name and a directory name.

6. The apparatus of claim 3 wherein said at least one processing platform is further configured to generate an interface for the user to define the one or more policy constraints.

7. The apparatus of claim 3 wherein said at least one processing platform is further configured to reject an additional stub file of the plurality of stub files for migration, wherein the additional stub file corresponds to an additional database entry comprising source storage location path information for the additional stub file.

8. The apparatus of claim 7, wherein, in rejecting the additional stub file, said at least one processing platform is configured to evaluate the additional database entry to determine that the additional database entry fails to satisfy the one or more policy constraints.

9. The apparatus of claim 1 wherein said at least one processing platform is configured generate an interface for a user to select a protocol to use for reading the plurality of stub files from the source storage location and for writing the plurality of stub files to the target storage location.

10. The apparatus of claim 1 wherein the plurality of database entries further comprise data about one or more attributes of the first stub file and the second stub file, and wherein the one or more attributes comprise at least one of a file modification time, a file size, an archive time and a storage protocol.

11. The apparatus of claim 10 wherein said at least one processing platform comprises a cloud tiering appliance.

12. The apparatus of claim 1 wherein the plurality of archived files are archived to a cloud storage platform.

13. A method comprising:
   selecting, by at least one processing platform comprising a processor coupled to a memory, at least a first stub file and a second stub file of a plurality of stub files for migration from a source storage location to a target storage location, wherein the plurality of stub files correspond to a plurality of archived files, wherein the plurality of stub files and one or more non-stub files are stored in the source storage location, wherein the selection of the first stub file and the second stub file is based at least in part on a plurality of database entries comprising source storage location path information for the first stub file and the second stub file, and wherein the plurality of database entries satisfy one or more policy constraints defined by a user;

migrating, by the at least one processing platform, the first stub file and the second stub file to the target storage location without migrating the one or more non-stub files to the target storage location, wherein the migrating comprises generating the first stub file and the second stub file in the target storage location;

modifying, by the at least one processing platform, the plurality of database entries by replacing the storage location path information with target storage location path information for the first stub file and the second stub file;

determining, by the at least one processing platform, that the modifying of a database entry of the plurality of database entries for the second stub file failed;

deleting, by the at least one processing platform, the generated second stub file from the target storage location responsive to the determination, wherein the second stub file is maintained in the source storage location; and repeating, by the at least one processing platform, the migrating and the modifying steps in connection with the second stub file following the deletion.

14. The method of claim 13 wherein migrating the first stub file to the target storage location further comprises deleting the first stub file from the source storage location.

15. The method of claim 13 wherein selecting the first stub file and the second stub file for migration comprises evaluating the plurality of database entries comprising the source storage location path information to determine that the plurality of database entries comprising the source storage location path information satisfy the one or more policy constraints.

16. The method of claim 15 further comprising rejecting an additional stub file of the plurality of stub files for migration, wherein the additional stub file corresponds to an additional database entry comprising source storage location path information for the additional stub file.

17. A computer program product comprising a non-transitory processor-readable storage medium having stored therein program code of one or more software programs, wherein the program code when executed by at least one processing platform, which comprises a processor coupled to a memory, causes said at least one processing platform:

to select at least a first stub file and a second stub file of a plurality of stub files for migration from a source storage location to a target storage location, wherein the plurality of stub files correspond to a plurality of archived files, wherein the plurality of stub files and one or more non-stub files are stored in the source storage location, wherein the selection of the first stub file and the second stub file is based at least in part on a plurality of database entries comprising source storage location path information for the first stub file and the second stub file, and wherein the plurality of database entries satisfy one or more policy constraints defined by a user;

to migrate the first stub file and the second stub file to the target storage location without migrating the one or more non-stub files to the target storage location, wherein the migrating comprises generating the first stub file and the second stub file in the target storage location;

to modify the plurality of database entries by replacing the storage location path information with target storage location path information for the first stub file and the second stub file;

to determine that the modifying of a database entry of the plurality of database entries for the second stub file failed;

to delete the generated second stub file from the target storage location responsive to the determination, wherein the second stub file is maintained in the source storage location; and to repeat the migrating and the modifying steps in connection with the second stub file following the deletion.

18. The computer program product according to claim 17 wherein, in migrating the first stub file to the target storage location, the program code further causes said at least one processing platform to delete the first stub file from the source storage location.

19. The computer program product according to claim 17 wherein, in selecting the first stub file and the second stub file for migration, the program code further causes said at least one processing platform to evaluate the plurality of database entries comprising the source storage location path information to determine that the plurality of database entries comprising the source storage location path information satisfy the one or more policy constraints.

20. The computer program product according to claim 19 wherein the program code further causes said at least one processing platform to reject an additional stub file of the plurality of stub files for migration, wherein the additional stub file corresponds to an additional database entry comprising source storage location path information for the additional stub file.

* * * * *